United States Patent [19]

Rossiter et al.

[11] 4,185,057
[45] Jan. 22, 1980

[54] DEWATERING OF PLASTIC MATERIALS WITH CONTROLLED GASEOUS INJECTION

[75] Inventors: Paul H. Rossiter, Paoli; Marvin F. Loetterle, Lafayette Hill, both of Pa.

[73] Assignee: W Bar E, Inc., Marianna, Fla.

[21] Appl. No.: 651,456

[22] Filed: Jan. 22, 1976

Related U.S. Application Data

[63] Continuation of Ser. No. 470,171, May 15, 1974, abandoned, which is a continuation of Ser. No. 877,743, Nov. 18, 1969, abandoned.

[51] Int. Cl.² .................. B29D 27/00; G01L 1/00
[52] U.S. Cl. ..................... 264/40.1; 264/50; 264/142; 425/146; 425/817 C
[58] Field of Search ............. 264/50, 142, 349, 40.7, 264/40.1; 260/2.5, 85.1, 272; 34/17; 425/86, 146, 817 C

[56] References Cited

U.S. PATENT DOCUMENTS

| | | | |
|---|---|---|---|
| 2,928,130 | 3/1960 | Gray | 264/50 |
| 3,062,759 | 11/1962 | Bingham et al. | 260/2.5 |
| 3,070,836 | 1/1963 | De Haven et al. | 264/40.7 |
| 3,222,797 | 12/1965 | Zies | 34/17 |
| 3,499,878 | 3/1970 | Wood | 260/85.1 |
| 3,583,679 | 6/1971 | Godley | 425/146 X |
| 3,673,126 | 6/1972 | Carmody et al. | 264/349 X |
| 3,755,516 | 8/1973 | Bonikowski et al. | 264/40.7 X |
| 3,806,569 | 4/1974 | Gallard et al. | 264/40.7 |
| 3,843,757 | 10/1974 | Ehrenfreund et al. | 264/34.9 X |
| 3,981,649 | 9/1976 | Shimano et al. | 264/40.1 X |

Primary Examiner—Philip Anderson
Attorney, Agent, or Firm—Miller & Prestia

[57] ABSTRACT

Plastic materials are dewatered in an extruder by applying heat and pressure and venting out vaporized water; before the plastic is extruded through the die orifice a gas is injected under high pressure into the plastic and this causes gas explosions when the plastic is released through the die orifices. The particles produced have micropores which provide improved workability, and form bales of controllable density.

3 Claims, 10 Drawing Figures

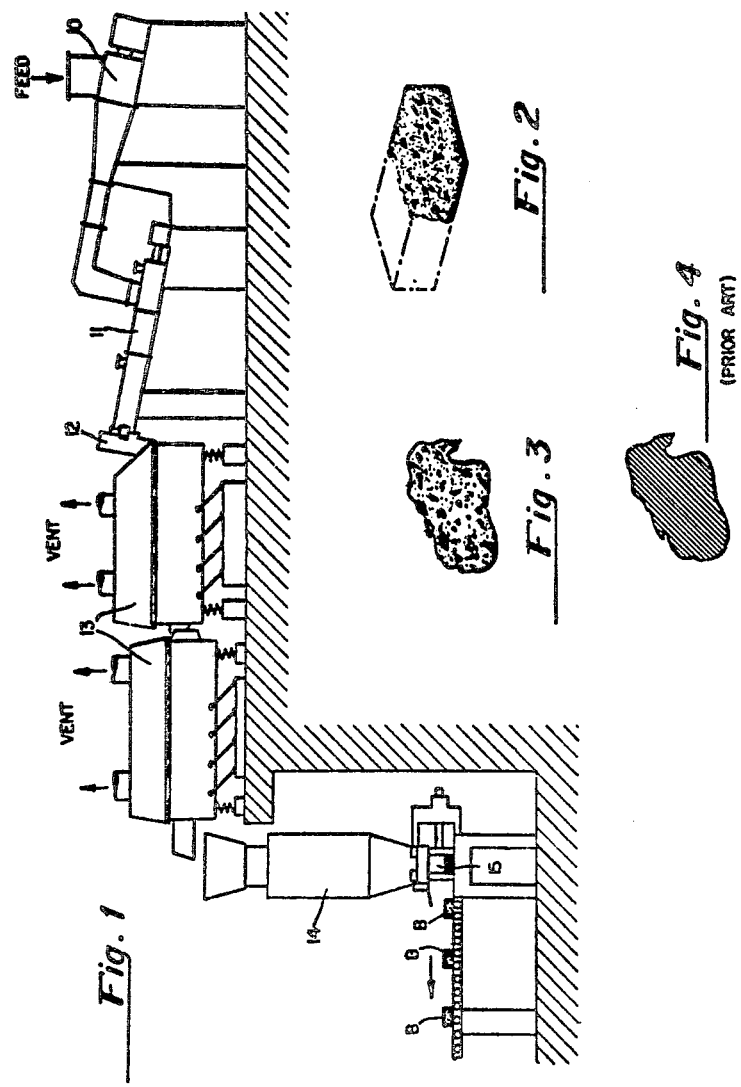

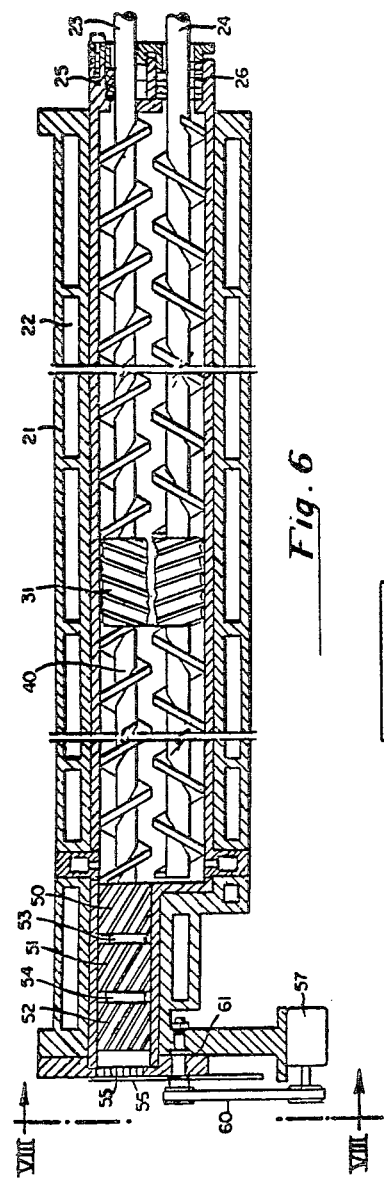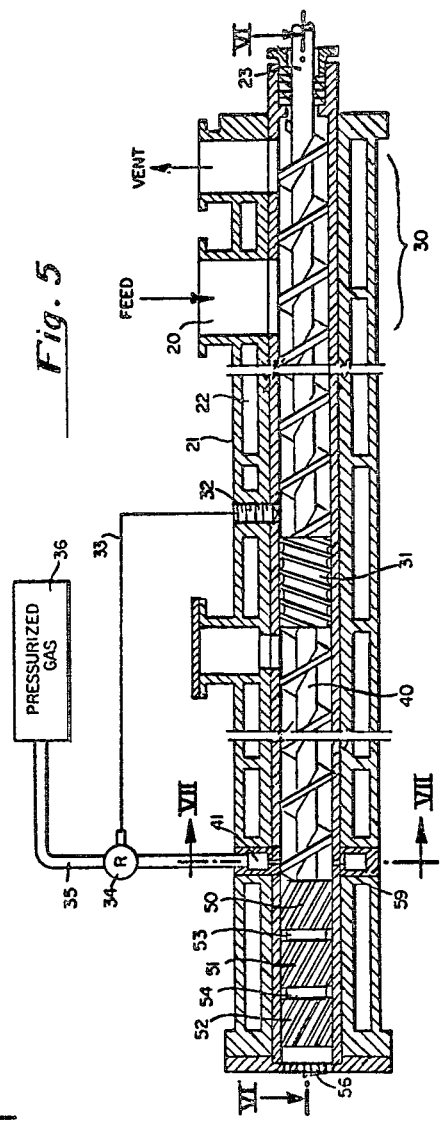

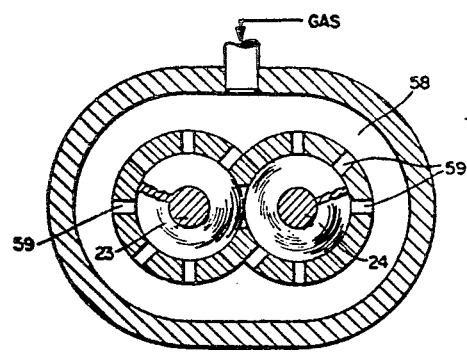
Fig. 7
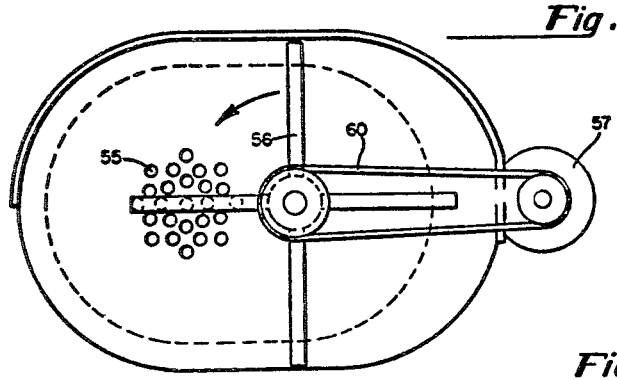
Fig. 8
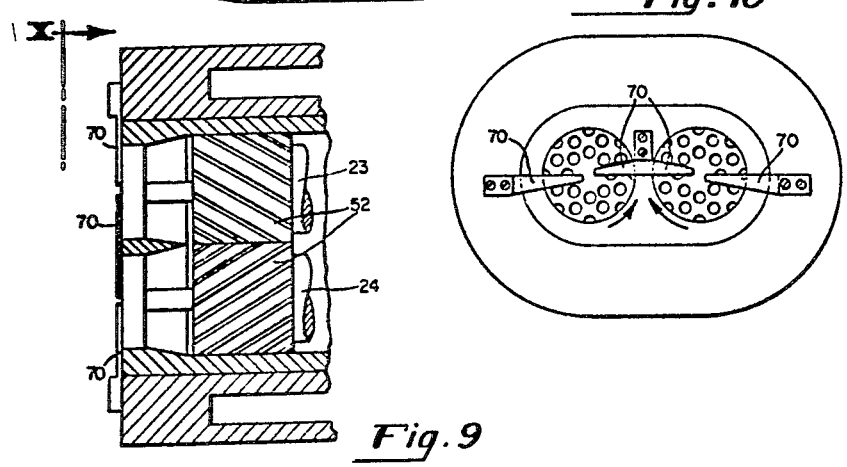
Fig. 10
Fig. 9

DEWATERING OF PLASTIC MATERIALS WITH CONTROLLED GASEOUS INJECTION

This is a continuation of application Ser. No. 470,171, filed May 15, 1974, which in turn is a continuation application of Ser. No. 877,743, filed Nov. 18, 1969, and both now abandoned.

BACKGROUND OF THE INVENTION

FIELD OF THE INVENTION AND DESCRIPTION OF THE PRIOR ART

This invention relates to a method for drying plastic materials such as rubber and the like, wherein most or all of the water is removed by vaporization or by pressure squeezing, or both, but which has a multiplicity of pores or voids.

In the production of processed rubber and various synthetic materials, the product often contains water in varying proportions. Indeed, the starting material sometimes contains as much as 50% by weight of water or even more, and it is often desired to remove the water until the product contains less than about 1% by weight of residual moisture, or less, while nevertheless producing the product in the form of a multiplicity of readily workable particles.

For some time it has been the accepted commercial practice to extrude plastics and the like by utilizing one or more worms rotating in a barrel, thus causing a heating and working of the plastic which can be utilized for the purpose of removing solvent from the plastic. One such apparatus which has been highly successful for accomplishing this end is shown and claimed in the Fuller Reissue U.S. Pat. No. 23,948, granted to the assignee of this application on Feb. 15, 1955.

When efforts are made to utilize the apparatus that is shown in the aforementioned Fuller Reissue patent, to remove substantial quantities of water from material such as rubber particles or the like, the presence of excessive quantities of water seriously impedes the efficiency of the apparatus, such that when efforts are made to enlarge the scale of the feed end of the extrusion dryer shown in the Fuller Reissue patent, the mere enlargement of parts has been found to be an inadequate solution to the problem of removing excessive quantities of drainable water such as in the order of 50% by weight more or less.

In the past, rubber has been conventionally dried in extruders or other continuously operating machines, for example those disclosed in the patent to Skidmore and Fulton U.S. Pat. No. 3,323,222, which utilize pressure squeezing followed by drying on a fluid bed conveyor.

It has also been suggested, in the patent to Zies U.S. Pat. No. 3,222,797, to charge rubber and water into an extruder and to provide heat and pressure, trapping the water with the rubber and exploding rubber plus steam out through the die orifice in the extruder. This process provides an expansion of rubber but, in the process of expansion, the escaping steam undergoes expansion cooling, and some of the steam tends to condense, reintroducing water into the rubber.

It is also desirable in the art to produce a more workable rubber crumb which is dry and which can be introduced into a mold and there compressed in order to form a generally cube-shaped unit which is normally referred to as a bale. The art has experienced some difficulty in carrying out the bale forming operation, due to poor workability of the rubber crumb. Accordingly, one object of this invention is to provide a rubber crumb having improved workability.

SUMMARY OF THE INVENTION

It has been discovered that, when dry rubber or other thermoplastic material, hereinafter generically referred to as dry rubber, is subjected to gas injection under pressure and elevated temperature in an enclosed continuously operating mixing mechanism such as an extruder or the like, and wherein all or a majority of the water or other liquid, hereinafter generically referred to as water, is removed either by pressure squeezing or by vaporization or both, that a new and highly useful rubber product can be obtained by injecting gas at high pressure into the rubber, by working the rubber and the gas together under pressure, and by then exploding the combined rubber and gas out of the pressure area and into an area of reduced pressure. The explosion ruptures the internal structures of the rubber, producing rubber crumb of great porosity, and this process also provides for the substantially permanent retention of gas within the rubber, predominantly in the form of pores or micropores. It has been surprisingly found that the presence of such pores or micropores provides a rubber crumb product having significantly improved workability for bale forming and other operations, and which is preferable commercially to rubber crumb produced in accordance with the prior art.

Preferably this invention is carried out in such a manner as to remove the water substantially completely at a location somewhere upstream of the final die. It is desirable in this process, to squeeze a sizable amount of the water rearwardly by by pressure and out of the dewaterer at or near the point of introduction of the wet rubber, and to remove part of the water by vaporization through vents. Worm sections are provided downstream of the point of introduction of the gas, to distribute the gas thoroughly by continuous working into the rubber.

DESCRIPTION OF THE PREFERRED EMBODIMENTS

Because of its ready availability, air is the preferred gas, particularly when compositions are being processed which are not damaged by oxidation at elevated temperatures. However, for heat sensitive materials of that type, nitrogen is an excellent gas for use in accordance with this invention and its use substantially completely eliminates oxidative degradation. The gas should preferably be as dry as possible. Many other gases may be used.

It has also been discovered that chlorobutyl rubber, for example, can be produced by introducing chlorine (either as a liquid or gas) into the extruder in accordance with this invention. The chlorine, which is a gas at room temperature, is preferably introduced in an amount which is only sufficient to react with the rubber to form chlorobutyl rubber, and in many processes it is advantageous to introduce either along with the chlorine or prior or subsequent to its introduction, another gas such as nitrogen or air. In this manner, substantially all of the chlorine is used for reaction with the rubber and substantially all of the other gas is used to create the explosive effect and the creation of pores in accordance with this invention.

It will be appreciated that, in the past, chlorinated rubber has been manufactured in standard reactors, following which the chlorinated rubber was processed in dewatering machines, extruders and dryers in order to remove the excess water. In view of the corrosive nature of the chlorine-containing medium, all such processing equipment was required to be corrosion-resistant and this has required very substantial expense in providing containers of nickel or nickel alloy or some other high-cost corrosion-resistant material. In accordance with this invention such expense is eliminated substantially completely, because it is unnecessary to provide any special corrosion-resistant material at any point in the system upstream of the point of introduction of chlorine into the specially provided worm sections of the extruder. It is to be noted that, just upstream of the point of introduction of chlorine into the extruder a pressure seal of material formed and this pressure seal prevents the chlorine from moving upstream into any other part of the extruder. This eliminates the need for special corrosion-resistant material upstream of the pressure seal. It will be apparent that, in accordance with a preferred embodiment of this invention, means are provided for sensing the presence of the pressure seal, and for preventing the introduction of chlorine into the extruder until the sensing device confirms that the proper pressure seal has been established.

This process is to be distinguished sharply from prior processes for making foam materials, such as foam polystyrene for example. It is not new to introduce gas in order to make foam, but we believe it is entirely new to introduce gas into a plastic material such as wet rubber in a drying process, wherein water is squeezed and vaporized out of the plastic, leaving the plastic in a hot, workable condition, and wherein a substance that is normally gaseous at room temperature and atmospheric pressure is then introduced into the plastic in a hot, workable condition and the resulting combination is kneaded and worked under elevated temperatures and then the gas and plastic are concurrently exploded violently out into the atmosphere, through the openings in an orifice plate, for example.

Accordingly, it is an object of this invention to provide a novel method for preparing exploded plastics of various types having improved working characteristics, and particularly to provide such particulate materials which are more easily and reliably handleable when using conventional baling techniques. Another object of this invention is to provide bales which are more uniform in character than those heretofore produced, and which have controllable density and improved workability. Other objects and advantages of this invention will further become apparent hereinafter and in the drawings.

DRAWINGS

FIG. 1 is a view in side elevation showing an apparatus according to this invention as it may be applied to a typical rubber dewatering and baling process.

FIG. 2 shows a typical rubber bale containing particles manufactured in accordance with the principles of this invention.

FIG. 3 shows a typical particle manufactured in accordance with this invention.

FIG. 4 shows a typical prior art rubber particle.

FIG. 5 is a side sectional view showing an apparatus constructed in accordance with one embodiment of this invention.

FIG. 6 is a sectional view taken as indicated by the lines and arrows VI—VI which appear in FIG. 5.

FIG. 7 is a sectional view taken as indicated by the lines and arrows VII—VII which appear in FIG. 5.

FIG. 8 is a sectional view taken as indicated by the lines and arrows VIII—VIII which appear in FIG. 6.

FIG. 9 is an enlarged fragmentary view showing the exit portion of a modified form of apparatus in accordance with this invention.

FIG. 10 is an end view looking at the same modified form, taken as indicated by the lines and arrows X—X which appear in FIG. 9.

Referring to FIG. 1, the number 10 designates a prior art rubber dewatering device similar to that disclosed in the patent to Rossiter U.S. Pat. No. 3,035,306, which feeds into an extruder 11 which may be of the general type disclosed in the reissue patent to Fuller U.S. Pat. No. 23,948, granted Feb. 15, 1955, but specially modified in accordance with the principles of this invention. The extruder 11 has a cutter element 12 which cuts the extrudate into small particles, all in the general manner disclosed in the patent to Skidmore and Fulton U.S. Pat. No. 3,323,222, such cut particles falling into fluid bed conveyor driers 13, in which the particles are maintained in a fluidized state by vertical vibrations of the conveyor and are dried by the continuous passage of heated air through the fluidized particles. The resulting dried particles are conducted to a collecting hopper 14 and are formed by means of a baling device 15 into bales B.

One form of apparatus which embodies features of this invention takes the place of the extruder 11 appearing in FIG. 1, and appears in particular detail in FIGS. 6 through 10 of the drawings.

Referring now to FIGS. 5 and 6 of the drawings in accordance with this invention, the number 20 designates the feed opening in an extruder housing 21 having a heating jacket 22. The extruder selected for illustration in the drawings is a twin screw extruder, the screws 23, 24 appearing in particular detail in FIG. 6. The screws 23, 24 are motor driven in the usual manner and enter the housing through sealing bearings 25, 26, which are conventional per se and are not described in detail herein. As shown, each extruder 23, 24 has a feed section 30, part of which is shown broken away in the drawings for convenience of illustration, followed by a compounding section 31 having a reverse thread direction, which forms a material plug in the space between the compounding worms and the interior surface of the extruder housing. Upstream of the section 31, at the location of the material plug, is a sensing device 32 which is connected by means of a low pressure air line 33 to a regulating valve 34 which is positioned in a gas line 35 connected to a source 36 of pressurized gas. Downstream of the compounding section 31 is a feed section 40 having a worm of greatly reduced core diameter as compared to the compounding section 31, permitting a sudden reduction of pressure of the material passing beyond the compounding section 31 into the spaces between the worm core 40 and the interior of the housing. At the downstream end of the forwarding section 40 is a gas injection ring 41, the details of which appear in FIG. 7. Downstream of the gas injection area, the worm 23 has three working sections 50, 51, 52 separated by sections of reduced diameter 53, 54. Just downstream of the section 52 is the usual orifice plate 55 through which the extrudate passes and is cut continuously by rotating knives 56 which are operated by motor 57 connected by means of belt 60 to a shaft 61 which continuously rotates the knives 56 in a manner to cut the extrudate continuously. Further details of the construction and arrangement of the knives appear in FIG. 8 of the drawings.

FIG. 7 shows that the gas is injected into a manifold 58 and through a multiplicity of spaced apart, radially directed openings 59 into the inter-flight spaces between the worms. The gas pressure is, for this purpose, greater than the pressure of the plastic material at the injection point.

FIGS. 9 and 10 show a modification of this invention, wherein both worm shafts 23 and 24 are co-extensive, as distinguished from FIG. 6 in which the shaft 23 is longer than the shaft 24. Material passes out of two orifice plates as appears in FIGS. 9 and 10 of the drawings, being advanced continuously by two final processing sections 52, 52. The knives are stationary and are designated by the number 70. They are attached to the worm housing in proper positions to accomplish the continuous cutting of the material as it passes out of the orifice plates.

It will be appreciated that the sensing device 32 senses the presence of a pressure plug of material which seals off the upstream part from the downstream part, at which the sensor 32 is located. When the sensor determines the plug is in fact in existence at that point, it relays information by means of a low pressure line 33 to the regulating valve 34, which opens in a manner to admit high pressure gas into the gas injection ring 41. This gas is injected at high pressure and travels with the plastic material through the worm section 50, the relief ring 53, section 51, relief ring 54, section 52 and then explodes out through the orifice plate. While the exceedingly high pressure of the gases that are trapped in the material are of themselves sufficient to rupture and tear the structure of the plastic material to produce small particles, the cutters assist in forming particles of more uniform size and shape than would be achieved otherwise.

It is important to observe that, in undergoing the transition from each section 50, 51, 52, the plastic material undergoes extremely thorough admixture with the tiny bubbles of high pressure gas that have been injected, thus causing the bubbles to become uniformly distributed with respect to the plastic material and causing the plastic material to be worked under such conditions of pressure and temperature as to provide for a series of continuous small explosions as the material is extruded through the holes in the orifice plate. The extent, duration and size of such explosions can readily be controlled by controlling the relative quantities of injected gas and the flow rate of the plastic material. Further, the pressure of the gas and the temperature of the mix can readily be controlled in order to provide optimum results for any particular combination of gas and plastic material.

An important advantage of this invention is that different rubbers have different handling characteristics and that these differences of characteristics can readily be compensated for by controlling the air pressure and volume of air per pound of rubber introduced. This provides an element of control which is of great advantage in performing subsequent rubber baling operations.

It will be appreciated that other chemical reactant gases may be used instead of chlorine. One typical example is bromine, which can be used to make bromobutyl rubber, for example. This invention advantageously produces an aerated bale having a multiplicity of gas-filled closed cells. In contrast, in the prior art, using normal rubber pellets composed of solid particles, or pellets which have been exploded by the steam explosion process, each rubber pellet has a fragmented surface area which includes many interstices and voids. When these pellets are placed into a baling press and formed under pressure into a bale, much of the air in these interstices and voids between the particles is trapped between the pellets and this produces an aerated bale such as that appearing schematically in FIG. 2, for example. However, some typical bale forming machines use a vacuum pick-up device to pick up the bale either in the process of removing it from the bale forming machinery, or carrying it to another location after completion of its formation. The vacuum pick-up device actually contacts the bale and the vacuum tends to draw out the trapped air, causing a collapsing of the bale. It is greatly advantageous that in accordance with this invention, the air is not trapped in between the particles or pellets, but is trapped within the particle or pellet itself, in a manner analogous to a foam pellet. Thus, the operation of the vacuum equipment in the bale former does not remove all of the air and does not create a collapsing of the bale.

Another advantage in accordance with this invention is that an air-foam pellet of rubber such as that appearing schematically in FIG. 3 is capable of being formed into a bale having much more dimensional stability than rubber which has been steam-puffed. When the pellets have been puffed up by steam, the steam condenses on cooling and this densifies the pellet again, as is indicated schematically in FIG. 4, whereas air will remain air regardless of any normal temperature reduction, and this provides a foam pellet which makes an exceptionally satisfactory and useful bale. In accordance with this invention, of course, the bale of rubber consists of a multiplicity of pellets pressed together, each pellet containing a multiplicity of gas pores. The gas pores are normally air or nitrogen or some other gas which is non-reactive with the rubber, and are embedded in the particles as distinguished from the spaces between the particles.

This invention is applicable to substantially any type of dewatering device or extruder. The extruder can either be single screw or twin screw, or multiple screw. Normally, a twin screw extruder is preferred because of its commerical availability and because it provides better mixing than a single screw extruder.

The pressures under which the gas are introduced are normally very high as compared with the general practice with respect to compressed air. As an example, high pressure air in accordance with this invention might have a pressure of about 500 pounds per square inch for example, but pressures of about 25-1000 p.s.i.g. may be used, depending upon the circumstances.

In connection with the chlorination of rubber according to this invention, it is highly desirable to provide a pressure sensor for the chlorine either at the point of its introduction or close to it, since the pressure sensor actually proportions the amount of chlorine with respect to the amount of rubber. This is because any increase of material pressure means that the chlorine has been reacting with the rubber at a decreased rate, and this pressure increase automatically adjusts the rate of feed of chlorine to match it with the variations of rate of feed of the rubber and reaction with the rubber.

It will be noted that it is preferred to use, with the twin worm extruder, two extrusion dies mounted on the end of the worm, with both worms co-extensive and side by side, as appears in FIGS. 9 and 10. The advantage of this is that the thrusts of the worms are balanced.

Another advantage in accordance with this invention is that, by regulating the pressure of introduction of the gas, the relative violence of the explosions can be adjusted and controlled. It will be appreciated that, when a pressure as high as 500 pounds per square inch is maintained within the extruder, the bubbles in the rubber are virtually microscopic at that pressure, but after they have exploded through the die orifices, they are very much larger at atmospheric pressure. Variation of the pressure of introduction also provides a ready means for controlling the density of the final bale.

Although this invention has been described with reference to specific forms of apparatus and method which have been found most useful in carrying the invention into effect, it will be appreciated that many variations may be resorted to without departing from the scope of the invention. For example, with respect to the apparatus, various equivalent means may be substituted for those specifically disclosed in the drawings and described in this specification, certain parts may be used independently of the use of others, and equivalent elements may be substituted for those particularly referred to. Further, with respect to the method steps, equivalent steps may be substituted, certain steps can be used independently of others, and steps may be reversed where appropriate, all as will be appreciated by those skilled in the art.

While this specification has made frequent reference to the separation of water from a solid material, it is to be appreciated that this invention applies broadly to the separation of any liquid which can be squeezed and drained out of a solid material and/or removed by vaporization. It is to be understood expressly, however, that where in the specification and claims we refer to a "dewatering extruder", to the step of "dewatering" and generally to the "removal of water from solids", such expressions are intended to cover the removal of any liquid as the full equivalent of the removal of water. Similarly, where the specification refers to the removal of a liquid from rubber or chlorinated rubber, it is to be understood that this invention is clearly applicable to the removal of any drainable and/or vaporizable liquid from any plastic material other than natural or synthetic rubber, for example, for the removal of styrene monomer from polystryene, solvent from polycarbonates, polyethylene, polypropylene and wide varieties of other plastic materials.

Where reference is made in the specification and claims to the injection of a gas under high pressure into the plastic material, various gaseous materials are intended to be included, provided that they are substantially in gaseous form under normal atmospheric conditions of temperature and pressure. However, it is to be understood that, under the exceedingly high pressures which may exist at the point of injection, some substances which are normally gases at atmospheric temperature and pressure are liquids at the point of injection, and they are clearly within the scope of this invention. Indeed, some gases such as chlorine for example are conveniently stored and handled in the liquid form and can be injected very advantageously in liquid form. As stated, the criterion is whether they are normally gaseous under normal conditions, namely, approximately one atmosphere pressure and a temperature of about 70° F.

With respect to the injection of a gas into the plastic material, it will be appreciated that in some instances it may be found desirable to inject a mixture of gases instead of a single gas, or even a mixture of liquids and gases. For example, nitrogen and chlorine in selected proportions may be injected into the plastic material under such conditions that the chlorine reacts with the plastic material (such as butyl rubber, for example) while the nitrogen forms minute voids under the conditions and for the purposes heretofore discussed in detail. When desired, any number of gases or liquids, even more than two, can be injected in combination or even separately from one another at separate points along the path of movement of the plastic material in process.

This invention has the capacity to provide a particularly completely dried product, particularly if the injected gas is rather dry, because the injected gas has the capacity to scrub residual amounts of moisture from the plastic material during the kneading and working period within the extruder, and to carry such absorbed water out to the atmosphere as a consequence of the explosive release at the orifice plate.

It will further be appreciated that the hot plastic material, while under elevated temperature and at high pressure and containing high pressure injected gas, may be violently exploded into any area of lower pressure, whether the pressure be atmospheric or above or below. Indeed, the pressure explosions may even take place stepwise by causing the material to move through successive areas of progressively reduced pressure. A sudden explosive exposure to atmospheric pressure is, however, preferred.

The following is claimed:

1. In a method of producing essentially dry rubber particles containing a multiplicity of gas-filled closed cells therein, from rubber material, the steps which comprise mechanically working said rubber material under heat and pressure such that the rubber material is pliable and workable, forming a first seal of a portion of said pliable material to form a pressure region in which said pliable material is maintained under pressure, sensing and signaling the change in pressure resulting from the formation of said pressure region, injecting a fluid under controlled pressure in response to said signal into another portion of said rubber material downstream of said pressure region while it is workable and under pressure, said fluid being a gas at normal atmospheric pressure and temperature, co-mingling said rubber material and said injected fluid under pressure while causing them to flow in a downstream direction, substantially uniformly mixing said fluid into said rubber material, and releasing both said rubber material and the admixed fluid, cocurrently and in a downstream direction, to an area of reduced pressure.

2. The method defined in claim 1, wherein said rubber material is chlorobutyl rubber and said fluid is air.

3. The method defined in claim 1, wherein said fluid is nitrogen.

4. The method defined in claim 1, wherein the rubber material is subjected to a mechanical cutting step.

5. In a method of producing essentially dry rubber particles containing a multiplicity of gas-filled closed cells therein, from rubber material, the steps which comprise mechanically working said rubber material under heat and pressure such that the rubber material is pliable and workable, forming a first seal with a portion of said pliable material to form a pressure region in which said pliable material is maintained under pressure, sensing the change in pressure resulting from the formation of said seal and signaling said pressure change, injecting a fluid under controlled pressure in response to said signal into another portion of said rubber material downstream of said pressure region while it is workable and under pressure, said fluid being a gas at normal atmospheric pressure and temperature, co-mingling said rubber material and said injected fluid under pressure while causing them to flow in a downstream direction, substantially uniformly mixing said fluid into said rubber material and forming a second seal, and then releasing the admixed fluid and rubber material in a downstream direction, to an area of reduced pressure.

6. In a process for working and drying rubber material under heat and pressure in a pliable state in an apparatus having rotary means for continuously moving said rubber material in a downstream direction, the improvement which comprises injecting a neutral gas under pressure into said apparatus at a pressure of 25 to 1,000 P.S.I.G. so as to promote the flowability of said pliable material in the downstream direction.

7. The process of claim 6, wherein said pressure is continuously varied.

8. In a method of producing essentially of rubber particles containing a multiplicity of gas-filled closed cells therein, from rubber material, the steps which comprise feeding said material into a first worm feed section of an extruder and mechanically working said rubber material under heat and pressure such that the rubber material is pliable and workable, forming a first seal of a portion of said pliable material to form a pressure region in which said pliable material is maintained under pressure, sensing and signaling the change in pressure resulting from the formation of said pressure region, injecting a fluid under controlled pressure in response to said signal into another portion of said rubber material downstream of said pressure region while it is workable and under pressure, said fluid being a gas at normal atmospheric pressure and temperature, co-mingling said rubber material and said injected fluid under pressure in a second worm section while causing them to flow in a downstream direction and forming a second seal, substantially uniformly mixing said fluid into said rubber material and then releasing both said rubber material and admixed fluid cocurrently in a downstream direction, to an area of reduced pressure.

* * * * *

UNITED STATES PATENT AND TRADEMARK OFFICE
CERTIFICATE OF CORRECTION

PATENT NO. : 4,185,057
DATED : 1/22/80
INVENTOR(S) : Paul H. Rossiter et al

It is certified that error appears in the above-identified patent and that said Letters Patent are hereby corrected as shown below:

Column 10, line 1, insert --dry-- and delete "of"

Signed and Sealed this

Seventeenth Day of June 1980

[SEAL]

Attest:

SIDNEY A. DIAMOND

Attesting Officer

Commissioner of Patents and Trademarks